US008577060B2

(12) United States Patent
Weiner et al.

(10) Patent No.: US 8,577,060 B2
(45) Date of Patent: Nov. 5, 2013

(54) METHOD AND APPARATUS FOR DYNAMICALLY DETERMINING MIX SETS IN AN AUDIO PROCESSOR

(75) Inventors: Keith Weiner, Queen Creek, AZ (US); Frederick Scott, Phoenix, AZ (US); Wendell Neff, Chandler, AZ (US)

(73) Assignee: Avaya Inc., Basking Ridge, NJ (US)

( * ) Notice: Subject to any disclaimer, the term of this patent is extended or adjusted under 35 U.S.C. 154(b) by 1016 days.

(21) Appl. No.: 12/497,064

(22) Filed: Jul. 2, 2009

(65) Prior Publication Data

US 2011/0002482 A1    Jan. 6, 2011

(51) Int. Cl.
*H04B 1/00*    (2006.01)

(52) U.S. Cl.
USPC .......................................... 381/119; 709/205

(58) Field of Classification Search
USPC .............. 381/80, 81, 82, 77, 119, 58; 700/94; 369/4; 463/42; 709/205, 252
See application file for complete search history.

(56) References Cited

U.S. PATENT DOCUMENTS

| | | | | |
|---|---|---|---|---|
| 6,912,565 | B1 * | 6/2005 | Powers et al. ................. | 709/205 |
| 8,126,985 | B1 * | 2/2012 | Kandekar et al. ............. | 709/217 |
| 2003/0182001 | A1 * | 9/2003 | Radenkovic et al. ........... | 700/94 |
| 2005/0047507 | A1 * | 3/2005 | Ju ............................. | 375/240.12 |
| 2005/0181872 | A1 | 8/2005 | Acharya et al. | |
| 2008/0177833 | A1 * | 7/2008 | Gu et al. ....................... | 709/204 |
| 2008/0234844 | A1 * | 9/2008 | Boustead et al. ............... | 700/94 |
| 2010/0049346 | A1 * | 2/2010 | Boustead et al. ............... | 700/94 |
| 2010/0070807 | A1 * | 3/2010 | Hamilton et al. ............... | 714/48 |

FOREIGN PATENT DOCUMENTS

| | | |
|---|---|---|
| EP | 1312188 | 5/2003 |
| WO | 02/17579 | 2/2002 |

OTHER PUBLICATIONS

Boustead et al., "DICE: Internet Delivery of Immersive Voice Communication for Crowded Virtual Spaces", IEEE Virtual Reality 2005, Mar. 15, 2005, pp. 35-41.
International Search Report dated Oct. 6, 2010; International Application No. PCT/US20108/040892; Filed Jul. 2, 2010.

* cited by examiner

*Primary Examiner* — Vivian Chin
*Assistant Examiner* — Friedrich W Fahnert
(74) *Attorney, Agent, or Firm* — Saul Ewing LLP

(57) ABSTRACT

Methods and apparatus are disclosed for dynamically selecting the number of audio channels to mix per listener in an audio processor, such as a server-based three-dimensional audio mixer, as a function of any reasonable measurement of the load on the audio processor.

22 Claims, 3 Drawing Sheets

METHOD AND APPARATUS FOR DYNAMICALLY DETERMINING MIX SETS IN AN AUDIO PROCESSOR

FIELD OF THE INVENTION

The invention pertains to audio processing. More particularly, the invention pertains to methods and apparatus for maintaining the most immersive audio experience possible within the limits of the available audio processing equipment.

BACKGROUND OF THE INVENTION

In standard communication devices using monaural audio reproduction systems, such as certain table radios, televisions, telephones, and speaker phones, all of the sound on the audio channel that is reproduced typically emanates from a single speaker. The listener is provided no sense of spatial separation between multiple sources of the various sounds emanating from the speaker. Stereo audio systems and more advanced surround sound audio systems, such as THX™, Dolby Pro Logic™, Dolby Digital™, DTS™, and Sony Dynamic Digital Sound (SDDS)™ add spatial aspects to the sound reproduction by virtue of the way in which the sound is split between two or more speakers (or channels) and/or audio processed (e.g., run through algorithms to alter the relative phases of the signals on the multiple output channels). This provides the listener with a more realistic sense of the location of the sources of the various sounds that might be reproduced. For instance, in a musical piece, the overall sound reproduction through a stereo system may give the sense that the singer is standing in the middle of the stage, the guitar player is standing on the right side of the stage, the bass player is standing on the left side of the stage, and the drummer is behind the singer. In fact, some of the audio processing algorithms available today can even provide a sense of sound coming from behind, above, or below the listener. Other techniques and algorithms are also able to simulate the sound of particular environments, such as a concert hall, a small room, or outdoors.

Overall, it is now possible to present a remarkably immersive and realistic audio experience using as few as two audio channels/speakers. The applications for such immersive three dimensional audio experiences are virtually limitless. To name just a few, they include, the audio accompanying television programs and movies, conference call systems, video games, and on-line virtual realities.

SUMMARY OF THE INVENTION

The invention pertains to methods and apparatus for dynamically selecting the number of audio channels to mix per listener in an audio processor, such as a server-based three-dimensional audio mixer, as a function of any reasonable measurement of the load on the audio processor. For instance, the maximum number of channels to mix for any given listener may be set to a first number for all active listeners unless and until the audio processing load on the audio mixer exceeds a threshold and then the maximum number of audio channels to mix for each listener may be reduced to a lower number. The specific number may be determined as a function of one or more of such factors as the overall audio processing load as measured or estimated by any reasonable means, a level of service elected by each listener, and virtual environmental factors.

DETAILED DESCRIPTION OF THE INVENTION

In immersive three-dimensional audio reproduction situations in which the input audio is predetermined and the processing equipment needs to generate an output for a single listening environment, such as the audio accompanying prerecorded television programs, movies, or video games, the audio processing power needed by the audio system is relatively small. The audio processing power for conventional conference calling and audio chat in virtual reality systems also requires relatively little audio processing power since each listener (except for one or two who may be speaking) receive the same audio mix.

Figure 1:
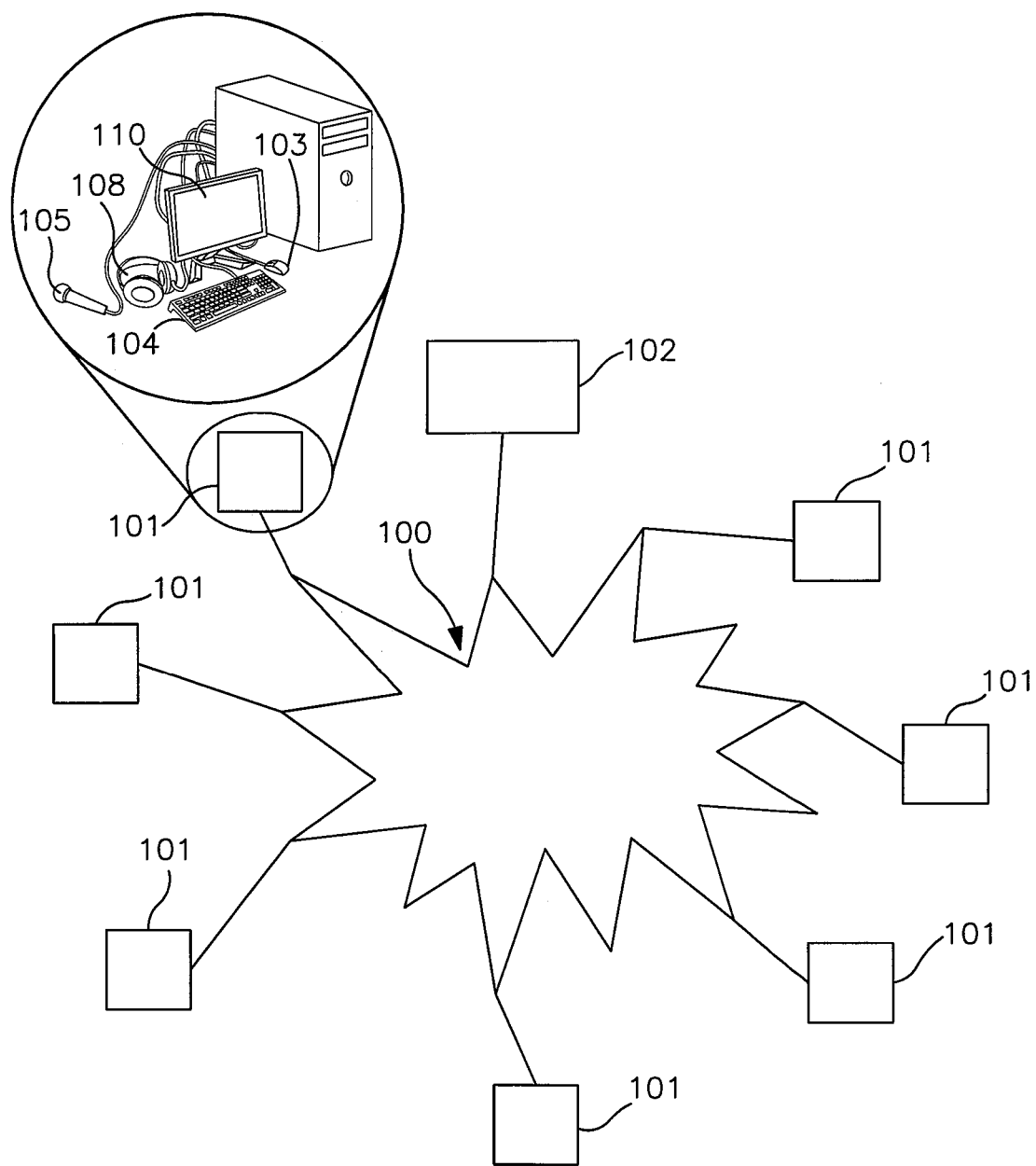
FIG. 1 is a block diagram of a network environment in which a server provides an immersive audio experience to a plurality of users.

However, in other cases, such as advanced conference calling systems and online (or other) virtual realities utilizing realistic three-dimensional audio processing systems, significant audio processing power may be required. Specifically, not only is the audio input not predetermined, but rather is being generated in real time from multiple audio input sources, but each participant potentially receives a different audio output stream in real time, each receiving a potentially different mix of the various input audio channels. For instance, using an online virtual reality service as an example and referring to FIG. 1, there may be a thousand different people at a thousand different client computers 101 participating in the virtual reality simultaneously. Each of these client computers communicates with each other via a network such as the internet 100. In one example, a server 102 provides the basic structure of the virtual reality and receives all of the input audio from each of these client computers and uniquely mixes the data on the input audio channels for output to each such participant. (Note that, for sake of simplifying the language, we shall refer to each participant's input audio data as an audio channel: however, it should be understood that each participant may, and probably is, generating at least two separate channels, e.g., stereo input, to the system. We also use the same convention with respect to each output audio channel. That is, is order to experience an immersive audio experience each participant is likely receiving at least two channels of audio so as to have at least stereo output sound, but we shall simply refer to each participant's output audio as a channel.)

Each participant in the virtual reality interacts with the virtual reality and the other participants through the use of computer interface devices. For instance, each client computer 101 may comprise output devices, such as a monitor 110 to allow the user to see a display of the virtual reality and one or more speakers 108 (in this case, exemplarily shown as a stereo headphone set) for allowing the user to hear what is going on in the virtual reality. In addition, the participant interacts with and in the virtual reality by virtue of one or more computer input devices, such as a computer mouse 103, a keyboard 104, and one or more microphones 105 for inputting audio into the virtual reality (e.g., speaking to someone else).

Figure 2:
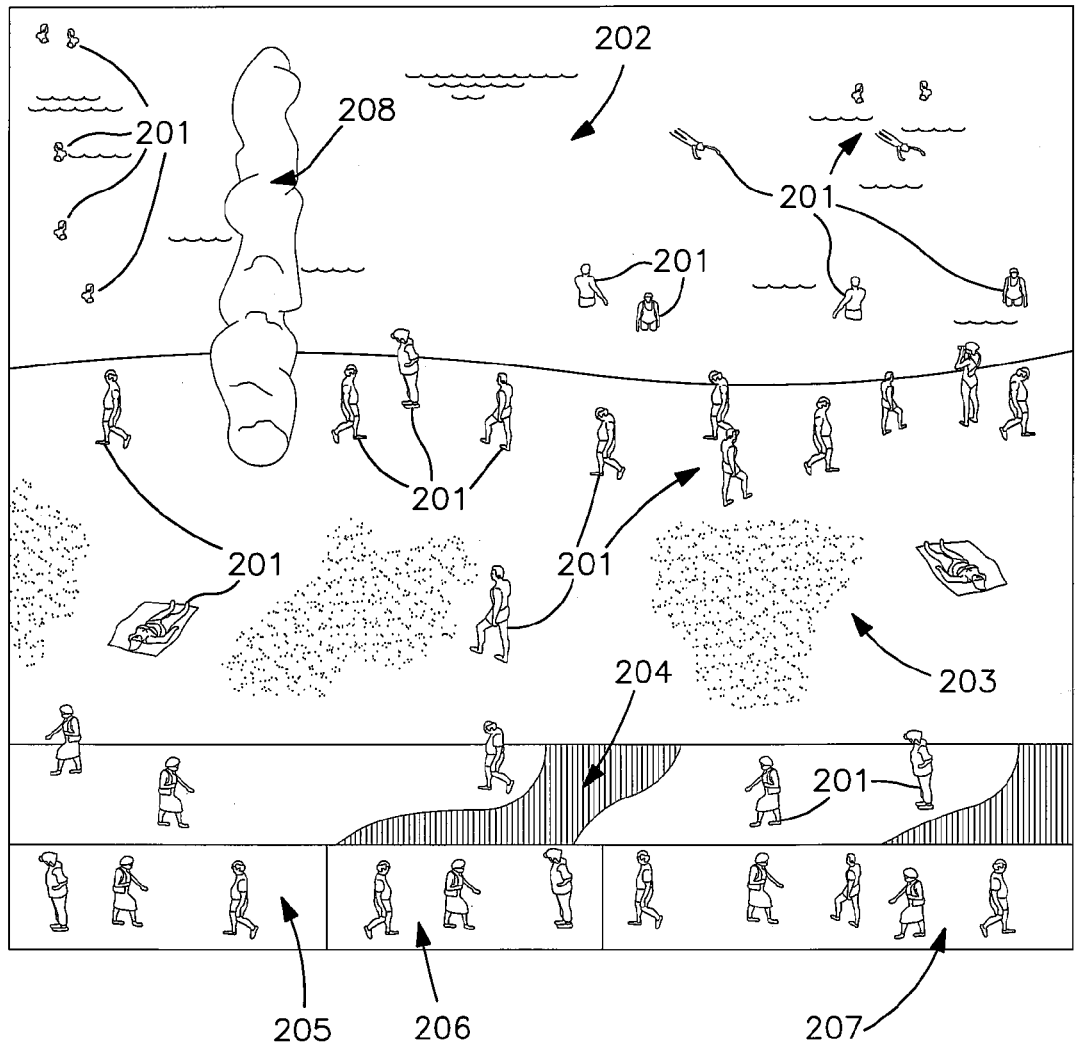
FIG. 2 illustrates a virtual environment, such as a graphical user interface for a virtual reality game, in connection with which the present invention may be used to provide an immersive three-dimensional audio experience.

FIG. 2 shows an exemplary virtual reality environment 200 that may be displayed on the display monitors of the persons participating in the virtual reality. In this particular example (which may comprise only a portion of a complete virtual reality world), the virtual reality is a beach environment. Each person participating in the virtual reality at their client computer 101 has an avatar 201 in the virtual reality which is a visual representation of that participant's character. The individual sitting at his computer 101 can control what his or her avatar 201 does in the virtual reality through the use of his mouse 103, keyboard 104, microphone 105, or any other computer/human interface device to move about the virtual reality and interact with the virtual reality and the avatars of the other participants.

Accordingly, as might be typical of a real-life beach environment, a number of participants/avatars 201 are playing in the water 202, other avatars are sitting, walking, lying down, or playing on the sand 203, other avatars 201 are walking on a boardwalk 204, and various other avatars 201 are in various indoor areas, such as a changing room 205, a store 206, and a restaurant 207.

In real life, each person in this scene might hear different voices and sounds and each voice or sound might sound different to each person depending on environmental and other factors. Thus, in order to provide an immersive three dimensional audio experience for the individuals sitting at their computers 101 participating in the virtual reality, the audio processor should generate potentially different mix of voices, each processed through a potentially different algorithm and/or using different parameters within a given algorithm, to simulate a real life audio experience. Thus, it should be apparent that a large amount of audio processing power is required. For instance, each individual sitting at his or her computer with one or more microphones is generating input audio to the virtual reality. Each of those individuals also has at least two speakers (stereo) that reproduce an immersive three dimensional audio experience. Thus, in this exemplary scenario with server-based immersive three dimensional audio processing, the audio processing system at the server 102 receives audio input signals from each participant and uniquely mixes that audio to generate an audio output signal for each of the participants. Thus, for each additional participant, his or her input audio channel(s) potentially must be added to the mix for every other participant. Likewise, for each additional participant, every other participant's input audio potentially comprises part of his or her output audio mix. Hence, the amount of audio processing power required could increase exponentially or close to exponentially as a function of the number of participants.

Of course, it will be appreciated that the audio from each input channel (i.e., the audio input into the system at each computer) is not necessarily mixed into each of the audio output channels. For instance, in a real life situation, the persons in the water on the right of the jetty 208 probably would not be able to hear any of the sound generated by the persons on the left side of the jetty. This is not only because there is a solid object (the jetty) between them, but also because of the background noise of the waves. Furthermore, the persons on the boardwalk probably cannot hear any of the people in the water simply because the distance is too great. Finally, the persons inside the changing room probably can only hear the other people in the changing room and not any of the people on the boardwalk, on the beach, in the water, or any of the other establishments because of the solid walls of the changing room as well as distance. Accordingly, it is not necessarily a requirement that the output audio mix to each participant's computer contain audio input from every other participant's computer in order to maintain a substantially realistic immersive three-dimensional audio experience. If there are a thousand participants in the virtual reality beach environment, that does not mean that the audio mixer needs to mix a thousand input audio streams of the client machines to generate each of the output audio streams for each of the clients machines. In order to minimize the audio processing power while still maintaining an immersive three-dimensional audio experience, the audio mixing software makes decisions with respect to each participant as to how many of the audio input channels of the various other participants it should mix together in generating that participant's audio output channel. For instance, the software may specify a maximum number of audio channels to mix per output audio channel that cannot be exceeded, although this certainly is not a requirement. Other factors that may be weighed in determining whether or not to include an audio input channel in an audio output channel include the virtual distance in the virtual reality between the avatar corresponding to particular audio input signal (e.g., the listening avatar) and the avatar corresponding to the output audio stream (e.g., the speaking avatar) as well as the volume of the audio being produced by the avatar corresponding to the output audio stream. Again, decisions can be made on any combination of these factors. For instance, the processor may simple decide that anyone more than 50 meters away does not need to be added into the mix or anyone producing audio that is below a certain VU reading does not need to be in the mix. Alternately, some combination of the VU reading and virtual distance may be used. Other factors that may be considered in determining what input audio channels are mixed into any given output audio channel include the presence or absence and the composition of obstacles between the two avatars, such as walls, jetties, etc. Another factor might be background noise within the virtual reality, such as wind or waves.

An extremely realistic three-dimensional audio experience can be produced for a listener by mixing the input audio from surprisingly few input audio channels at any given instant. This is because, typically, at any given moment, most participants are not speaking (or otherwise generating audio input). Particularly, just like in real life, at any given instant, in a crowded room, a very small percentage of the people are speaking and the rest are listening. Particularly, as a rough general rule, on average only about 4-5% of people are generating appreciable audio within a closed environment, such as a room, at any given instant. Furthermore, even with respect to the person or persons who are speaking, the audio duty cycle on average is about 50%. That is, even when a person is speaking at length, there is silence about half of the overall time. Accordingly, over an extended period of time, a very realistic immersive three-dimensional audio experience can be reproduced for a very large number of participants by mixing the audio from only a small number of them at any given instant. For instance, it is relatively easy to generate a realistic immersive audio output of the audio in a room of 25 people or more by mixing as few as eight or fewer audio input channels at any given instant for each audio output channel.

However, it is not uncommon for a transient event to cause a large group of people, e.g. all of the people in the exemplary room of 50 people, to generate audio simultaneously, thereby overloading the audio mixer. For instance, if someone tells a joke and everyone in the room laughs simultaneously, the sound mixing processing load will increase dramatically. Such an event might overload the system, which could lead to a system crash or at least a very unnatural sounding breakdown in the audio reproduction of the audio output channels.

The present invention provides a solution to this problem by monitoring the processing load on the audio mixer such as by monitoring any reasonable indicator thereof, and changing the parameters of the algorithm that determine the number of audio input channels that will be mixed to create the audio output channels of the various participants to decrease the audio processing load as a function of the audio processing load.

The manner in which the audio output channel mixing algorithm parameters can be varied as a function of load can take many forms. For instance, as previously mentioned, one parameter in the algorithm for determining how many audio input channels to mix to create any given audio output channel may be a maximum number of channels that can be mixed. This is a value that indicates, no matter what the other parameters are (e.g., distance between participants, VU reading on the respective input audio channels, sound blocking obstacles between participants, etc.), there is a absolute maximum number of channels that might be mixed per output audio channel. This number could be reduced during times of high audio processing load. In one particular embodiment, this maximum number to mix can be reduced across the board for all participants. In another embodiment, the number may be reduced as a function of a level of service selected or paid for by the participant. For instance, in one simple example, the service provider of the virtual reality may offer its users two different service levels at two different prices. In situations of high audio processing load, only the participants with the lower level of service may have their maximum number of channels to mix parameter decreased.

A more complex reduction algorithm is preferable so as not to waste processing power. Merely as an example, if the load measurement indicates that the audio processing load needs to be reduced by 38.9% in order not to overload the system and the default maximum number to mix is 8, then an across the board reduction of the maximum number to mix for all participants to 5, which achieves a 37.2% reduction would be insufficient. Therefore, the system would have to choose to reduce the maximum number to mix to 4. However, this achieve s a reduction of 50%, thus leaving 11.1% of the available audio processing power unused at a time when it is critically necessary in order to maintain the immersiveness of the audio experience.

In other embodiments, other parameters can be changed. For instance, also as previously mentioned, there might be parameters in the mixing algorithm specifying a combination of VU reading or a virtual distance between two participants that is used to determine whether one participant's input audio should be included in the mix of another participant's output audio channel. One or more of these values may be decreased during times of high load, e.g., requiring a shorter distance, a higher VU reading, or for any combination thereof to qualify for inclusion in the mix. In other embodiments, the reduction can alternately or additionally be a function of the virtual reality environment of the participant. For instance, person in a high density area of the virtual reality (e.g., a crowded room) may have their maximum number to mix reduced to a lesser extent than participants in other environments.

The reduction in audio input channels in a participant's mix may or may not cause a loss of the immersiveness of the audio, but, presumably in the vast majority of situations, will still allow the participant to receive the audio necessary to continue participating without significant adverse effect.

Virtually any reasonable parameter or combination of parameters indicative of audio processing load may be used. Such parameters may include, for instance, memory bandwidth load, bus bandwidth load, or CPU pipeline load. Of course, in a situation in which a certain thread of the CPU load is dedicated to audio processing, whereas other threads of the CPU are dedicated to other functions, the relevant thread load should be observed, rather than the over CPU pipeline load.

In yet other embodiments, the audio processing load can be estimated from the number of mix units. The number of mix units is the total number of audio input channels being mixed during any given period. It is essentially the summation of the number of audio channels being mixed for each output audio channel.

Figure 3:
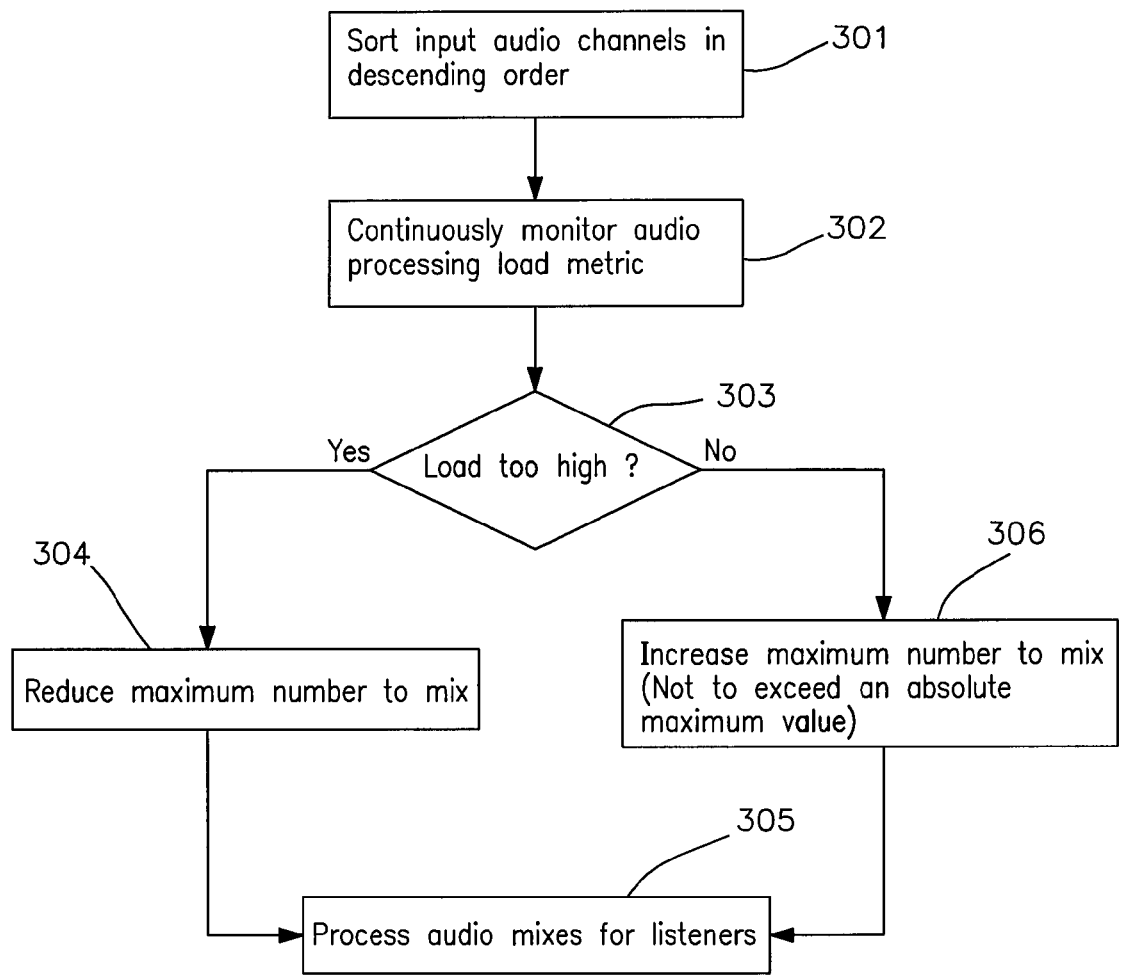
FIG. 3 is a flow diagram illustrating process flow in accordance with one embodiment of the present invention.

FIG. 3 is a flowchart illustrating one simplified process flow for implementing an audio processing system in accordance with the principles of the present invention. In this simple example, the maximum number of input audio channels that can be mixed to produce an output audio channel for all participants will be set as a function of audio processing load. Also, as will be seen, this example is set up as a continuous feedback loop to attempt to keep the processing load near the overload threshold. However, a feedback loop type of system is merely a very simple example and is not limiting.

In step 301, for each participant, the input audio channels or other participants are sorted in descending order of importance of being included in the mix. As previously noted, this may be a function of one or more factors such as volume (VU reading) of the input audio channels and distance between the specific listener and the specific speaker or any other reasonable factor. In step 302, the audio processing load is continuously monitored using any reasonable indicator thereof, including any of the factors mentioned hereinabove. In step 303, it is determined if the audio processing load exceeds a predetermined threshold. In this pure feedback type embodiment, that threshold should be set somewhere close to, but below the maximum processing load of the audio mixing system. If so, flow proceeds to step 304 in which the system reduces the maximum number to mix to a lower number. This can be achieved in any number of ways. In one embodiment, the number can be reduced by one on every pass through the flow. In other embodiments, the number can be reduced based on the specific load value to immediately bring the load down below the threshold. In any event. Flow them proceeds to step 305, in which the audio mixes for all the participants are created and output to the participants' client computers.

If, on the other hand, in step 303, the load did not exceed the predetermined threshold, flow instead proceeds to step 306. In step 306, the system increases the value of the maximum number of channels to mix to try to keep the audio processing load near the maximum load. However, even in a pure feedback type embodiment as illustrated in FIG. 3, it is probably advisable to set some absolute maximum number of channels to mix per participant. Otherwise, during times of very low use (i.e., low number of active participants, the maximum number to mix might become higher than is reasonably necessary to present an immersive audio experience. For instance, it is rarely the case that anyone needs to hear the simultaneous speaking of more than 20 people to maintain immersiveness.

The present invention may be implemented by means of software running on a general purpose computer or a specially designed computer. Alternately, it could be implemented by any reasonable form of circuitry, including, for example, digital and analog circuits, state machines, FPGAs, combinational logic circuits, microprocessors, Application Specific Integrated Circuits (ASICs) or any combinations thereof, including some software components, some firmware components and/or some hardware components.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A method of mixing a plurality of audio input channels to create at least one audio output channel for a given listener in an audio mixer comprising:
   determining a processing load on the audio mixer;
   selecting a number of audio input channels to mix in creating the at least one audio output channel as a function of the load on the audio processor; and
   creating a mix of a multiplicity of the plurality of audio input channels on the at least one audio output channel;
   wherein said at least one audio output channel for said given listener is uniquely mixed for said given listener.

2. The method of claim 1 wherein the selecting a number comprises selecting a maximum number of audio input channels that may be mixed in creating the at least one audio output channel.

3. The method of claim 2 wherein the selecting comprises using a first value as the maximum number of audio channels when the processing load is below a first threshold and adjusting the maximum number of audio channels to a second value when the processing load is above the first threshold.

4. The method of claim 2 wherein the at least one output channel comprises a plurality of output channels and wherein the selecting comprises using a first value as the maximum number of audio channels for each of the audio output channels when the processing load is below a first threshold and adjusting the maximum number of audio channels to a second value for at least one of the audio output channels when the processing load is above the first threshold.

5. The method of claim 4 wherein the determining comprises determining a load on a processing thread of the audio mixer being used to mix audio for the audio output channels.

6. The method of claim 1 wherein the audio mixer is a three-dimensional audio mixer.

7. The method of claim 1 wherein the determining comprises determining at least one of memory bandwidth load in the audio mixer, CPU pipeline load in the audio mixer, bus bandwidth load in the audio mixer, and a total number of mix units being processed by the audio mixer.

8. The method of claim 1 wherein the audio mixer is located at a server on a communicating network.

9. The method of claim 8 wherein the audio mixer receives the plurality of audio input channels from clients on the communication network and sends the audio output channels to a plurality of clients on the communication network.

10. The method of claim 2 wherein the at least one output channel comprises a plurality of audio output channels and wherein the selecting comprises selecting a first value as the maximum number of audio channels to mix for all of the audio output channels when the processing load is below a predetermined threshold and selecting a second value as the maximum number of audio channels to mix for all of the audio output channels when the processing load is above the predetermined threshold.

11. The method of claim 2 wherein the at least one output channel comprises a plurality of audio output channels and wherein the selecting comprises, when the processing load is below a predetermined threshold, selecting a first value as the maximum number of audio channels to mix for all of the audio output channels and, when the processing load is below a predetermined threshold, adjusting the maximum number of audio output channels to mix to a different value for different ones of the audio output channels.

12. The method of claim 11 wherein the adjusting comprises choosing the maximum number of audio output channels to mix for each audio output channel as a further function of a level of service assigned to each audio output channel.

13. The method of claim 12 wherein each audio output channel corresponds to a subscriber account, the method further comprising:
   assigning a level of service to each subscriber account.

14. A computer program product embodied in a non-transitory computer readable medium comprising:
   first computer executable instructions for mixing a plurality of audio input channels to create content for at least one audio output channel for a given listener;
   second computer executable instructions for determining a processing load on the first computer executable instructions; and
   third computer executable instructions for selecting a number of audio input channels to mix in creating the at least one audio output channel as a function of the load on the audio processor, wherein the at least one audio output channel for said given listener is uniquely mixed for said given listener.

15. The computer program product of claim 14 wherein the second computer executable instructions select a maximum number of audio input channels that may be mixed in creating the at least one audio output channel.

16. The computer program product of claim 15 wherein the second computer executable instructions comprises computer executable instructions for selecting as the maximum number of audio channels to mix a first value when the processing load is below a first threshold and computer executable instructions for adjusting the maximum number of audio channels to a second value when the processing load is above the first threshold.

17. The computer program product of claim 15 wherein the at least one output channel comprises a plurality of output channels and wherein the computer executable instructions for selecting comprises computer executable instructions for using a first value as the maximum number of audio channels for each of the audio output channels when the processing load is below a first threshold and adjusting the maximum number of audio channels to a second value for at least one of the audio output channels when the processing load is above the first threshold.

18. The computer program product of claim 14 wherein the computer executable instructions for determining comprises computer executable instructions for determining at least one of a memory bandwidth load, a CPU pipeline load, a bus bandwidth load, and a total number of mix units being processed by the first computer executable instructions.

19. The computer program product of claim 14 wherein the at least one output channel comprises a plurality of output channels, the product further comprising:
   computer executable instructions for receiving the plurality of input audio channels from clients via a communication network; and
   computer executable instructions for sending the audio output content for the plurality of audio output channels to a plurality of clients via the communication network.

20. The computer program product of claim 15 wherein the at least one output channel comprises a plurality of audio output channels and wherein the computer executable instructions for selecting comprises computer executable instructions for selecting a first value as the maximum number of audio channels to mix for all of the audio output channels when the processing load is below a predetermined threshold and selecting a second value as the maximum number of audio channels to mix for all of the audio output channels when the processing load is above the predetermined threshold.

21. The computer program product of claim 15 wherein the at least one output channel comprises a plurality of audio output channels and wherein the computer executable instructions for selecting comprises computer executable instructions for, when the processing load is below a predetermined threshold, selecting a first value as the maximum number of audio channels to mix for all of the audio output channels and, when the processing load is below a predetermined threshold, adjusting the maximum number of audio output channels to mix to a different value for different ones of the audio output channels.

22. The computer program product of claim 21 wherein each audio output channel corresponds to a subscriber account and wherein the computer executable instructions for adjusting comprises computer executable instructions for choosing the maximum number of audio output channels to mix for each audio output channel as a further function of a level of service assigned to each audio output channel.

* * * * *